(12) United States Patent
Keereepart et al.

(10) Patent No.: US 7,681,144 B2
(45) Date of Patent: Mar. 16, 2010

(54) PRIORITIZED PRESENTATION OF CONTENT

(75) Inventors: Thaniya Keereepart, Hoboken, NJ (US); Andrew Merryman, New York, NY (US)

(73) Assignee: MLB Advanced Media, L.P., New York, NY (US)

( * ) Notice: Subject to any disclaimer, the term of this patent is extended or adjusted under 35 U.S.C. 154(b) by 622 days.

(21) Appl. No.: 11/452,136

(22) Filed: Jun. 13, 2006

(65) Prior Publication Data

US 2007/0288864 A1      Dec. 13, 2007

(51) Int. Cl.
*G06F 3/048* (2006.01)
*G06F 7/00* (2006.01)

(52) U.S. Cl. ............... 715/790; 715/810; 707/104.1

(58) Field of Classification Search ........... 715/790, 715/794, 797, 810; 707/104.1
See application file for complete search history.

(56) References Cited

U.S. PATENT DOCUMENTS

| | | | |
|---|---|---|---|
| 5,987,466 A | 11/1999 | Greer et al. | |
| 6,760,048 B1* | 7/2004 | Bates et al. | 715/797 |
| 6,859,821 B1* | 2/2005 | Ozzie et al. | 709/205 |
| 6,961,901 B1 | 11/2005 | Colson | |
| 6,983,331 B1 | 1/2006 | Mitchell et al. | |
| 2001/0054049 A1 | 12/2001 | Maeda et al. | |
| 2002/0107884 A1 | 8/2002 | Banerjee et al. | |
| 2003/0052925 A1 | 3/2003 | Daimon et al. | |
| 2003/0090510 A1 | 5/2003 | Shuping et al. | |
| 2004/0001163 A1* | 1/2004 | Park | 348/569 |
| 2004/0252137 A1* | 12/2004 | Gelber | 345/629 |
| 2005/0080764 A1* | 4/2005 | Ito | 707/1 |
| 2005/0108350 A1 | 5/2005 | Dietz et al. | |
| 2005/0198678 A1* | 9/2005 | Mise et al. | 725/88 |
| 2005/0235219 A1 | 10/2005 | Szeto | |
| 2006/0095835 A1* | 5/2006 | Kennedy et al. | 715/513 |
| 2006/0150108 A1* | 7/2006 | Adachi et al. | 715/750 |

* cited by examiner

*Primary Examiner*—Ting Lee
(74) *Attorney, Agent, or Firm*—Foley & Lardner LLP

(57) ABSTRACT

A method is provided for determining content to present on a display of a device. The method comprises presenting a first content in a first location in an application window of an application and presenting a second content in a second location in the application window of the application. The method further comprises receiving a user action and determining whether at least a portion of the first content will be obstructed due to the user action. The method further comprises presenting the first content in the second location based on a comparison of a first content priority value assigned to the first content and a second content priority value assigned to the second content in accordance with the determination.

20 Claims, 14 Drawing Sheets

PRIORITIZED PRESENTATION OF CONTENT

FIELD OF THE INVENTION

The present disclosure is related generally to the presentation of content on a computer display. More specifically, the present disclosure relates to the presentation of content in an application window based on a predetermined prioritization.

BACKGROUND OF THE INVENTION

As reliance on modern technology continues to grow, content providers are beginning to utilize new avenues for presenting content to the public. Instead of relying solely on television, radio, newspapers, billboards, magazines, etc., content providers are depending more and more on computers, cell phones, personal digital assistants, portable gaming units, and other electronic devices to present content to the public. These devices execute applications which allow users to access and view content. One such application is a network browser which allows users to access websites and view content presented by a content provider over a network, such as the Internet.

The Internet is a wide area network that connects hundreds of thousands of computers and smaller sub-networks worldwide. A common form of presenting content over the Internet is through a website. A website is a collection of one or more web pages, each of which presents a specific set of content to a user. Every website includes a home web page, which acts as an entrance portal to the website by providing users with a basic understanding of the website's sponsor, purpose, and content. Website content providers can include businesses, governmental entities, educational organizations, and individuals. The content provided varies drastically depending on the content provider, and can include streaming video, music, links to other websites, internal advertisements and promotions, external advertisements, games, how to information, news, sports, weather, website navigation information, retail products, directions, contact information, and just about anything else imaginable.

Users can access the content presented on websites by using a network browser on any number of electronic devices. Network browsers allow a user to view and interact with websites through a network browser application window. In addition to network browsers, content providers utilize many other applications to present content to users. For instance, media player applications, word processing applications, document viewing applications, gaming applications, editing applications, electronic mail applications, etc. can also be used to present a broad array of content to users through an application window.

Regardless of the application through which content is presented to a user, content providers have great incentive to present as much content in an application window area as possible. This incentive can arise from the desire to maximize advertising revenue by including multiple advertisements in the application window, the desire to self-promote one's products and services, and the goal of providing the most complete, accurate, and up-to-date information available. Basic human nature also plays a roll. For instance, in the context of a web page, if a user is not able to find what he/she is looking for after a cursory examination, he/she may simply give up and look elsewhere for the information. Similarly, a user may not want to be burdened with having to scroll down or across a web page to find information. Thus, website providers have incentive to maximize the content presented on each web page and compress it all into a single screen. As a result, application windows are bursting at the seams with content.

Within an application window, users navigate, explore options, and view different content by activating links, activating tabs, activating drop down menus, causing pop-up text or windows to appear, opening additional application windows, scrolling, etc. In doing so, the view of presented content often becomes obstructed to the user. For instance, in the context of a web page, if a user activates a drop down menu, any content in the location under which the menu appears becomes obstructed. Similarly, if a user switches from a first tab to a second tab, the content of the first tab is replaced by the content from the second tab, even though the content of the first tab may be high priority content. In general, almost any user action taken in an application window, including opening additional application windows, can result in obstructed content. This problem is exacerbated by the fact that content providers try to maximize the amount of content presented in the application window.

Application programmers can attempt to alleviate the problem of obstructed content, and particularly the obstruction of high priority content, by statically placing such content in remote locations of an application window that will never become obstructed or by statically placing such content in central locations of the application window and designing the rest of the application to ensure that no obstruction occurs. However, both of these approaches are flawed and impractical. Statically placing high priority content in remote locations of an application window is disadvantageous because application users may never see the content and are much more likely to ignore it. Statically placing high priority content in central locations within an application window, while ensuring that the content never becomes obstructed, results in an awkward and non-user friendly application. Users expect the content with which they are interested to be centrally and aesthetically displayed and care little about the content provider's perspective with respect to content priority.

Thus, there is a need for a tool which allows a content provider to consistently present application users with an unobstructed view of high priority content. Further, there is a need for a tool which allows a content provider to prioritize content such that content of a higher priority can displace content of a lower priority when the higher priority content will become obstructed. Further yet, there is a need for a tool which allows a content provider to ensure that high priority content will always be presented in the most beneficial portion of an application window.

SUMMARY OF THE INVENTION

An exemplary embodiment relates to a method of presenting content in an application window of an application. Content can be presented such that high priority content is given preference over content of a lower priority with respect to presentation. Upon receipt of a user action which will cause high priority content to become obstructed, a movement algorithm can be executed to determine if the content which would become obstructed should be moved to another location. Thus, the user is always able to view high priority content, where priority can be determined from the content provider's perspective.

One exemplary embodiment provides a method for determining content to present on a display of a device. The method comprises presenting a first content in a first location in an application window of an application and presenting a second content in a second location in the application window of the application. The method further comprises determining whether at least a portion of the first content will be obstructed due to a user action in the application window. Further, the method comprises presenting the first content in the second location based on a comparison of a first content priority value assigned to the first content and a second content priority value assigned to the second content in accordance with the determination.

Another exemplary embodiment provides a computer-readable medium having computer-readable instructions stored thereon. The computer-readable instructions are configured to receive a first content priority value of a first content and a second content priority value of a second content, wherein the first content is of a higher priority than the second content. The computer-readable instructions are further configured to receive a user action from an application and determine whether at least a portion of the first content will be obstructed due to the user action. Further, the computer-readable instructions are configured to move the first content to displace the second content based on a comparison of the first content priority value and the second content priority value and in response to the user action in accordance with the determination.

Another exemplary embodiment provides a device for presenting content to a user. The device comprises an application, a memory, and a processor. The application comprises computer code configured to receive a first content priority value of a first content and receive a second content priority value of a second content, wherein the first content is of a higher priority than the second content. The computer code is further configured to receive a user action from a second application, determine whether at least a portion of the first content will be obstructed due to the user action, and move the first content to displace the second content based on a comparison of the first content priority value and the second content priority value and in response to the user action in accordance with the determination. The memory is configured to store the application. The processor is coupled to the memory and configured to execute the application.

Yet another exemplary embodiment provides a system for presenting content to a user. The system comprises a first device and a second device. The first device comprises a first application, a first memory, and a first processor. The first application comprises computer code configured to receive a first content priority value of a first content and a second content priority value of a second content, wherein the first content is of a higher priority than the second content. The computer code is further configured to receive a user action from a second application, to determine that at least a portion of the first content will be obstructed due to the user action, and to move the first content to displace the second content based on a comparison of the first content priority value and the second content priority value in response to the user action. The first memory is configured to store the first application. The first processor is coupled to the first memory and configured to execute the first application.

The second device is in communication with the first device via a network. The second device comprises the second application, a second memory, and a second processor. The second application comprises computer code configured to present an application window to a user. The first content and the second content are presented in the application window. The second memory is configured to store the second application. The second processor is coupled to the second memory and configured to execute the second application.

Other principal features and advantages will become apparent to those skilled in the art upon a review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

DETAILED DESCRIPTION OF EXEMPLARY EMBODIMENTS

Figure 1:
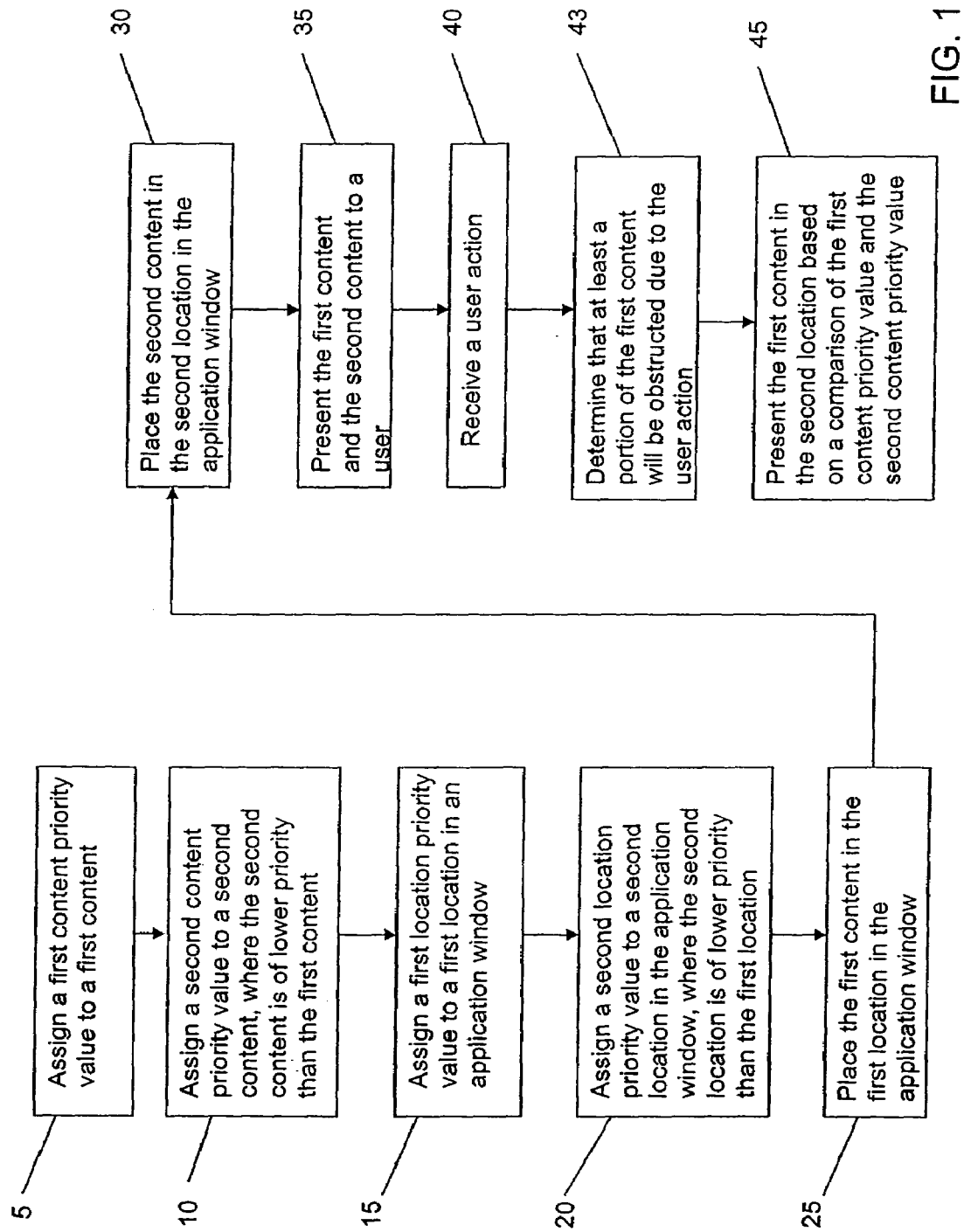
FIG. 1 is a flow diagram illustrating an exemplary process for presenting content.

FIG. 1 is a flow diagram illustrating an exemplary process for presenting content. Content can refer to anything which is presentable to a user through an interface or application window of an application. Typical types of content include, but are not limited to, advertisements, promotions, games, how to information, news, sports, weather, navigation information, links, tabs, menus, instructions, logos, contact information, mission statements, scrolling text, streaming video and other multi-media, music, pictures and other graphics, directions, retail product information, services information, disclaimers, search boxes, etc.

In an operation 5, a first content priority value is assigned to a first content. In an operation 10, a second content priority value is assigned to a second content, where the second content is of lower priority than the first content. In an alternative embodiment, the first content and the second content are of equal priority. Assignment of content priority values allows a content provider to specify the priority of a given piece of content in relation to other pieces of content which are to be presented to a user. As discussed in more detail below, the content priority values can be used to help determine whether a piece of content in an application window which becomes obstructed due to a user action should be moved to an unobstructed area of the application window, and possibly displace another piece of content in an unobstructed area of the application window.

Because the first content is of higher priority than the second content, the first content priority value can be a larger value than the second content priority value. Throughout this application, it will be assumed that a higher priority value is indicative of a higher priority. However, in an alternative embodiment, a lower content priority value can be used to indicate content of a higher priority. For example, to indicate that the first content is of higher priority than the second content, the first content can be assigned a content priority value which is smaller than that assigned to the second content.

Assignment of content priority values can depend entirely on the perspective of the content provider. For instance, in the context of a media player, the first (higher priority) content can be a link to a website which provides updates for the media player and the second content can be a 'how to' demonstration to assist users in using the media player. In the context of a website, the first content can be an internal advertisement promoting the website, and the second content can be an external advertisement paid for by a sponsor unrelated to the website. Alternatively, the first content can be an external advertisement for which the sponsor was willing to pay $500, and the second content can be an external advertisement for which the sponsor was willing to pay only $100. As such, the assignment of content priority values can be used by the content provider to generate more revenue via increased competition among external advertisers.

In one embodiment, each piece of content to be presented is assigned an individual content priority value. For instance, a company logo can be assigned a first content priority value, a first advertisement can be assigned a second content priority value, a second advertisement can be assigned a third content priority value, contact information of the provider can be assigned a fourth content priority value, and so on. In an alternative embodiment, multiple pieces of content can be categorically assigned the same content priority value. For instance, the content provider can categorically assign all internal advertisements a first content priority value, all external advertisements a second content priority value, all internal links a third content priority value, all external links a fourth content priority value, and so on. Alternatively, the content provider can randomly assign a first content priority value to a first internal advertisement, a first external advertisement, and a first external link, a second content priority value to a second internal advertisement, a second external advertisement, and a second external link, and so on. In one embodiment, only high priority content is assigned a content priority value, and the content priority value can be the same for all such content. In such an embodiment, content assigned a content priority value would be considered as having a higher priority than content that has no assigned content priority value.

In an operation 15, a first location priority value is assigned to a first location in an application window. In an operation 20, a second location priority value is assigned to a second location in the application window, where the second location is of lower priority than the first location. A location can refer to a specific region or area of an application window in which content can be presented. An application window can be a window through which web pages are presented, such as a web browser. Alternatively, the application window can be a window through which multi-media is viewed, a window through which documents are processed, edited, or displayed, a window through which games are played, a window through which folders or files are displayed, or any other window through which an application presents information to or receives information from an application user. Assignment of location priority values allows a content provider to specify the priority of a location in an application window in relation to other locations within the window. As discussed in more detail below, the location priority values can be used to help determine where a piece of content should be placed in an application window and/or whether and where the piece of content should be moved if it becomes obstructed.

The region in the center of an application window is oftentimes the location of highest priority because that is the region in which an application user is most likely to focus. However, depending on the particular content provider's perspective and the particular application, the location of highest priority in the application window can be off-center, along the sides of the application window, at the top of the application window, or at the bottom of the application window. In one embodiment, the priority of locations in an application window can vary depending on the content display configuration such that locations near the area in which a given piece of content is displayed are of higher priority than locations which are far from the area in which that content is displayed. As such, location priority values are not necessarily static, but can change as content is moved within an application window.

In one embodiment, each distinct location (as defined by the application provider) in an application window can be assigned an individual location priority value. For instance, a first location in a center region of an application window can be assigned a first location priority value, a second location in the center region of the application window can be assigned a second location priority value, a first location along the left edge of the application window can be assigned a third location priority value, and so on until each defined location has been assigned a location priority value. Alternatively, multiple locations can be categorically assigned the same location priority value. For instance, all locations in the center of an application window can be assigned a first location priority value, all locations at the top of the application window can be assigned a second location priority value, all locations at the bottom of the application window can be assigned a third location priority value, and so on. In one embodiment, only locations of high priority are assigned a location priority value, and the location priority value can be the same for all such locations. In such an embodiment, locations assigned a location priority value would be considered as having a higher priority than locations that have no assigned location priority value.

In an operation 25, the first content is placed in the first location in the application window. In an operation 30, the second content is placed in the second location in the application window. The first content, which is of higher priority than the second content, can be placed (or presented) in the first location because the first location is of higher priority than the second location. Iteratively repeating this placement process results in an application window in which content of a highest priority is placed in an application window location of highest priority and content of a lowest priority is placed in an application window location of lowest priority. In an alternative embodiment, the prioritized presentation of content can be implemented by using only content priority values and without assigning location priority values to locations in the application window. In this alternative embodiment, content is placed in the application window starting with the highest priority content and continuing in descending priority until no more locations are available for displaying content.

In an operation 35, the first content and the second content are presented to a user. Content presentation can be implemented via a server which communicates through a network to other devices, such as presentation of a website over the Internet. The user can use a network browser application to view and interact with the content in a network browser application window. Alternatively, content presentation can be implemented by providing a user with an application to be stored on a user device such that the user can view and interact with content in an application window when the user activates the application. A multi-media player stored locally on a user device is an example of such an application.

In an operation 40, a user action is received. The user action can be the selection of a tab, the activation of a tier of a drop down menu, the selection of a link, causing one or more additional application windows to open, the activation of pop-up text, or any other action which can potentially cause content in an application window to become obstructed. The user action can be performed via a computer mouse, keyboard, remote control, touch screen, device panel, or any other method by which a user can interact with an application.

In an operation 43, a determination is made whether at least a portion of the first content will be obstructed due to the user action. The determination can be made by considering the percentage of the overall area of the first content that will be obstructed, the portion of the first content that will be obstructed, or by other considerations, depending on the embodiment. The obstruction determination is discussed in more detail with reference to FIG. 2.

In an operation 45, if it is determined that the first content will be obstructed due to the user action, then the first content is presented in the second location based on a comparison of the first content priority value and the second content priority value. As a result, the user's view of the first content, which is of higher priority than the second content, remains unobstructed. In addition, if the second content is present in the second location, then the second content is displaced by the first content. Depending upon the number of locations, the second content can be placed in a lower priority location that is also not obstructed and displace any content present in that location. Thus, the user is always able to view the content that the content provider has designated as high priority. Content presentment (or movement) can be implemented via a movement algorithm which uses the content priority value of obstructed content, the content priority value of displaced content, the location priority value of the location occupied by the obstructed content, and/or the location priority value of the location occupied by the displaced content. There are numerous different ways in which the movement algorithm can be implemented to preserve the view of obstructed conduct, depending on the specific embodiment implemented and the preferences of the content provider. For example, when a user selects an item to engage a video player, a function executes to open a video player that may slide down and cover a scoreboard. As the video player is opened, another function is executed to move the display of the scoreboard next to the video player, thereby allowing the user to see both the video content and the scoreboard content simultaneously.

Figure 2:
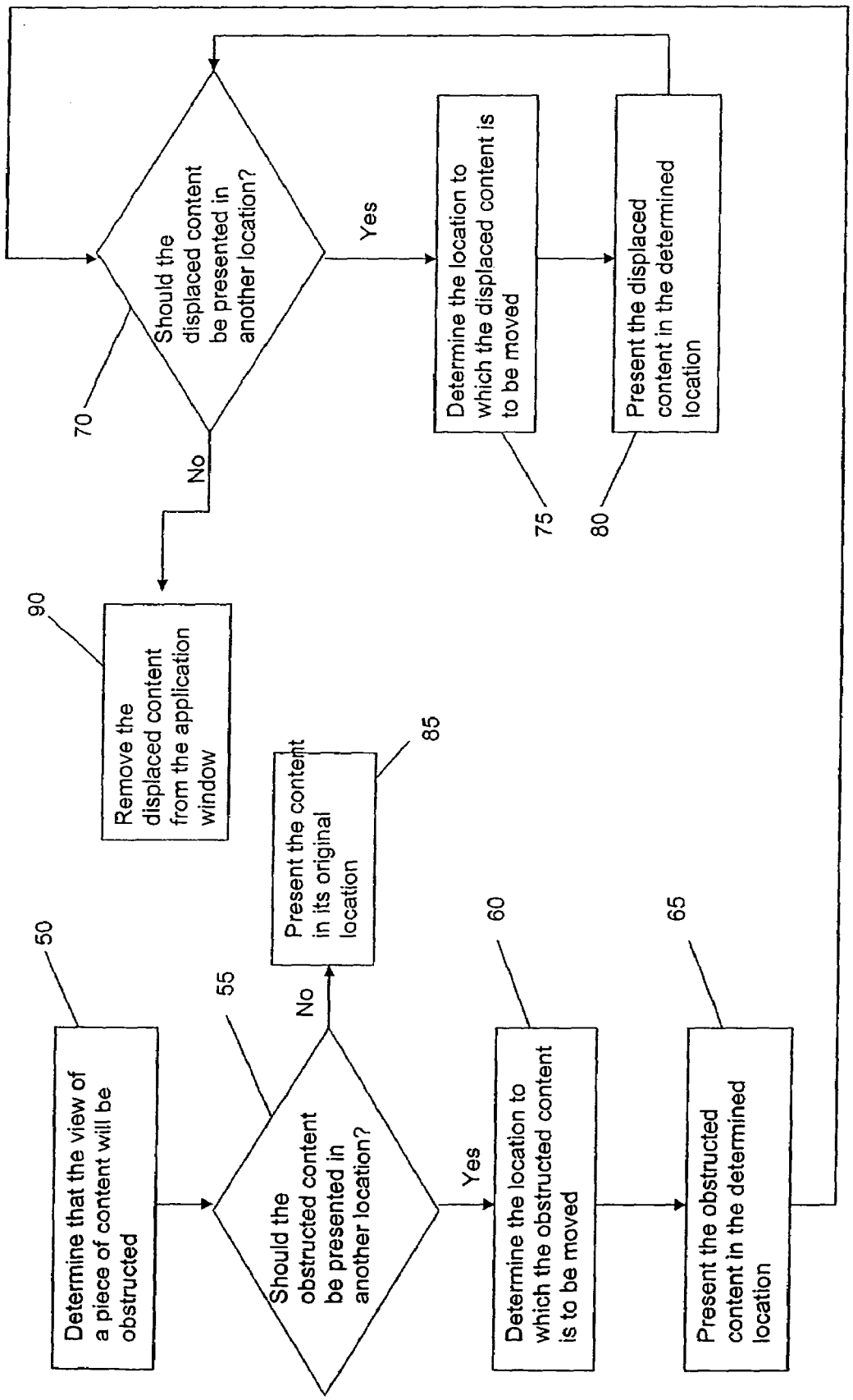
FIG. 2 is a flow diagram illustrating an exemplary process for moving obstructed and displaced content.

FIG. 2 is a flow diagram illustrating an exemplary process for moving obstructed and displaced content. In an operation 50, a movement algorithm determines whether the view of a piece of content will be obstructed. As discussed with reference to FIG. 1, the obstructed view can be the result of a user action. In one embodiment, content is considered obstructed if any portion of the content is covered and thus not visible to a user. In an alternative embodiment, content is considered obstructed only if a predetermined percentage of the content is covered and not visible to a user. In another alternative embodiment, content is considered obstructed only if a specific, valuable portion of the content is obstructed. For instance, if the content is an advertisement, the content can be considered obstructed only if the sponsor's logo is obstructed.

Upon a determination that the view of a piece of content will be obstructed (such content is hereinafter referred to as 'obstructed content'), the movement algorithm determines whether the obstructed content should be presented in another location in an operation 55. If it is determined that the obstructed content should not be presented in another location, content is presented in its original location in an operation 85. In one embodiment, obstructed content is not moved if it is extremely low priority content or if there is no suitable location to which it can be moved. The determination of whether to move obstructed content can be based on a threshold content priority value such that the obstructed content is moved only if its content priority value exceeds the threshold content priority value. In an alternative embodiment, content can be pre-designated as 'movable' or 'not movable' such that only 'movable' content is moved when it will become obstructed. The determination of whether to move obstructed content can also be based on the availability of a suitable location in the application window. A suitable location can be one that contains content with a lower content priority value than the obstructed content and in which the obstructed content will fit.

Upon a determination that the obstructed content should be presented in another location, the movement algorithm determines the location to which the obstructed content is to be moved in an operation 60. In one embodiment, the obstructed content can be moved to an unobstructed location that has the highest location priority value of any available location. In an alternative embodiment, the obstructed content can be moved to an unobstructed location that has the lowest location priority value of any available location. In another alternative embodiment, the obstructed content can be moved, irrespective of location, such that it displaces unobstructed content which has the highest content priority value of any of the content being presented. In another alternative embodiment, the obstructed content can be moved, irrespective of location, such that it displaces unobstructed content which has the lowest content priority value of any of the content being presented. In yet another alternative embodiment, location priority values and content priority values can be simultaneously utilized along with predetermined thresholds to make the determination of where to move the obstructed content. For instance, if obstructed content has a content priority value below a predetermined content priority value threshold, the obstructed content can be moved to a location which has a location priority value less than a predetermined location priority value threshold or to a location occupied by content that has a content priority value less than a predetermined content priority value threshold.

The determination of where to move obstructed content can also be made wholly, or in part, based on the size of the obstructed content. In one embodiment, obstructed content is only moved if there is an unobstructed, available location that can accommodate a full size version of the obstructed content. In an alternative embodiment, the obstructed content can be compressed such that a smaller version of it can be presented in an unobstructed location. Predetermined threshold values can be used to determine how much compression is feasible for a given piece of content. In another alternative embodiment, a replacement version of the obstructed content can be opened in an available unobstructed location. The replacement version can present all of the information that was presented in the original version of the obstructed content or only a subset of that information. In an operation 65, the movement algorithm moves the obstructed content such that it can be presented in the determined location.

In general, content providers strive to maximize the amount of content which they present to users. As such, all of the available locations in an unobstructed application window are likely to be occupied by various pieces of content. As a result, when obstructed content is moved to another location, existing content is displaced. In an operation 70, a displacement algorithm determines whether any displaced content should be presented in another location in the application window. This determination depends in part on the embodiment implemented for determining where to move obstructed content. For instance, if obstructed content is moved such that it displaces existing, unobstructed content with a lowest content priority value, it would not make sense to displace other higher priority content with the displaced lowest priority content. However, if obstructed content is moved such that it displaces existing, unobstructed content with a highest content priority value, the displaced content is presumably of a higher priority than other existing content in the application window. In that case, a trickle down displacement algorithm can be employed such that the displaced content iteratively displaces other existing content until a determination is made that no more displacement should occur. The actual determination of whether to displace existing content with displaced content can be based on the same criteria used to determine whether to move obstructed content, or on different criteria, depending on the embodiment. In one embodiment, displaced content never displaces other existing content.

The determination of whether to displace existing content with displaced content can also depend on the user action which caused the initial obstruction of content. For instance, if the cause of the obstruction is likely to be short-lived, as in the case of a user activating a drop down menu, it may not make sense to displace existing content with displaced content and in effect rearrange a large portion of the application window. However, if the obstruction is likely to last a significant amount of time, as in the case of a user activating real time streaming video content, it may be beneficial to iteratively displace some or all of the existing, unobstructed content with displaced content.

If it is determined that displaced content should not displace other existing content, the displaced content is removed from the application window in an operation 90. However, upon a determination that displaced content should displace other existing content, the displacement algorithm determines the location to which the displaced content is to be moved in an operation 75. The location determination can be based on the same criteria used to determine the location to which obstructed content is to be moved, or on different criteria, depending on the embodiment. In an operation 80, the displaced content is moved such that it can be presented in the determined location.

If the location to which the displaced content is moved is occupied, the result is a second piece of displaced content. Determinations regarding whether and where to move the second displaced content can be based on the same criteria used in making those determinations for the original displaced content. This process can be iteratively implemented, as indicated by the arrow between operation 80 and operation 70, until a determination is made that a given piece of displaced content should not displace other existing content. Alternatively, the process can be implemented a set number of times or until the content priority value of the displaced content drops below a predetermined content priority value threshold.

Figure 3:
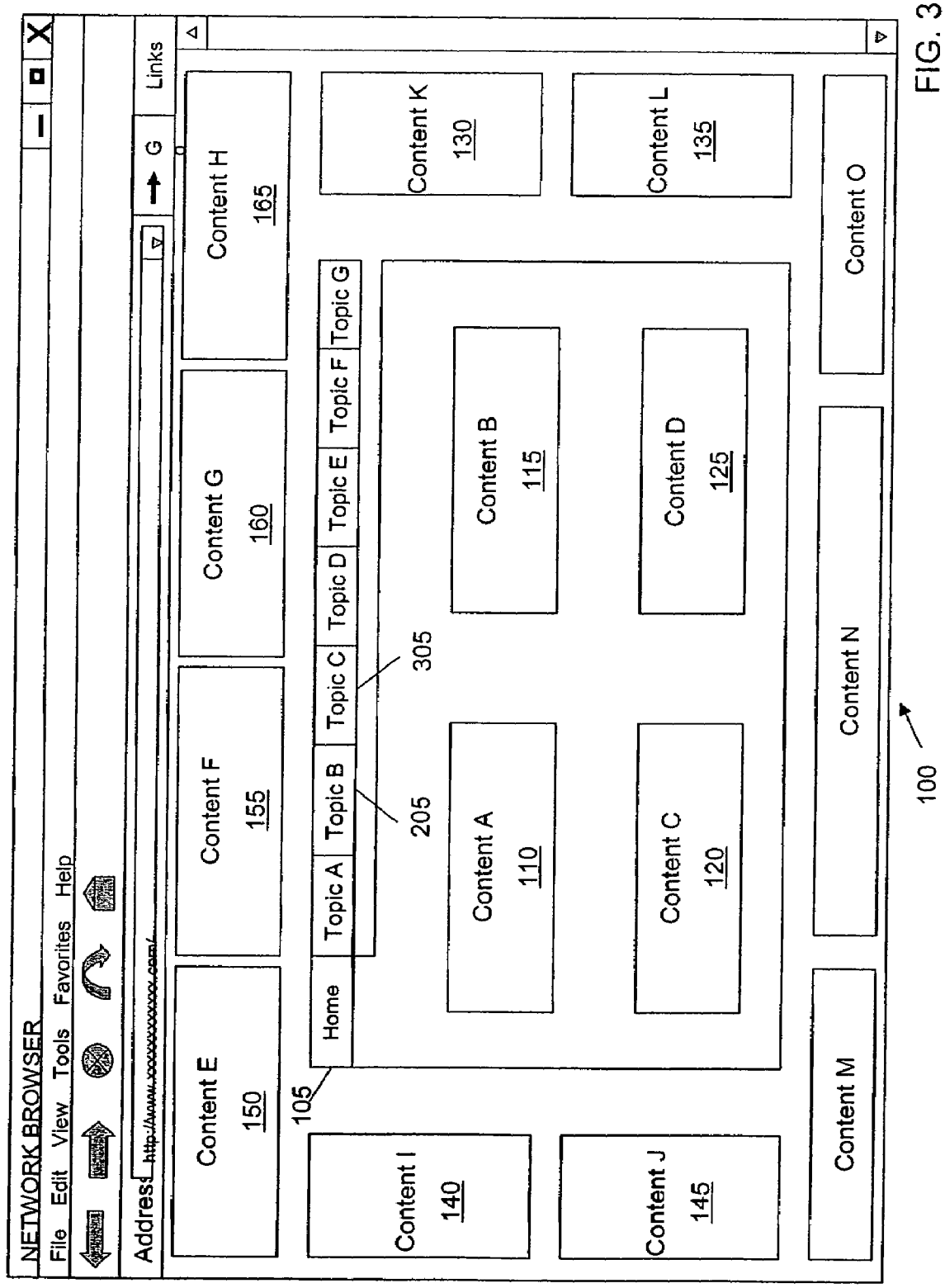
FIG. 3 is an exemplary network browser application window containing tabs and in which unobstructed content is presented to a user.

FIGS. 3-8 illustrate the process described with reference to FIGS. 1 and 2. FIG. 3 is an exemplary network browser application window 100 containing tabs and in which unobstructed content is presented to a user. The network browser application window 100 includes several tabs, including a home tab 105 for allowing a user to view information relating to various topics, a topic B tab 205, and a topic C tab 305. The content presented to the user when the home tab 105 is selected includes content A 110, content B 115, content C 120, and content D 125. Content to the right side of the home tab 105 includes content K 130 and content L 135 and content to the left side of the home tab 105 includes content I 140 and content J 145. Content on top of the home tab 105 includes content E 150, content F 155, content G 160, and content H 165.

Figure 4:
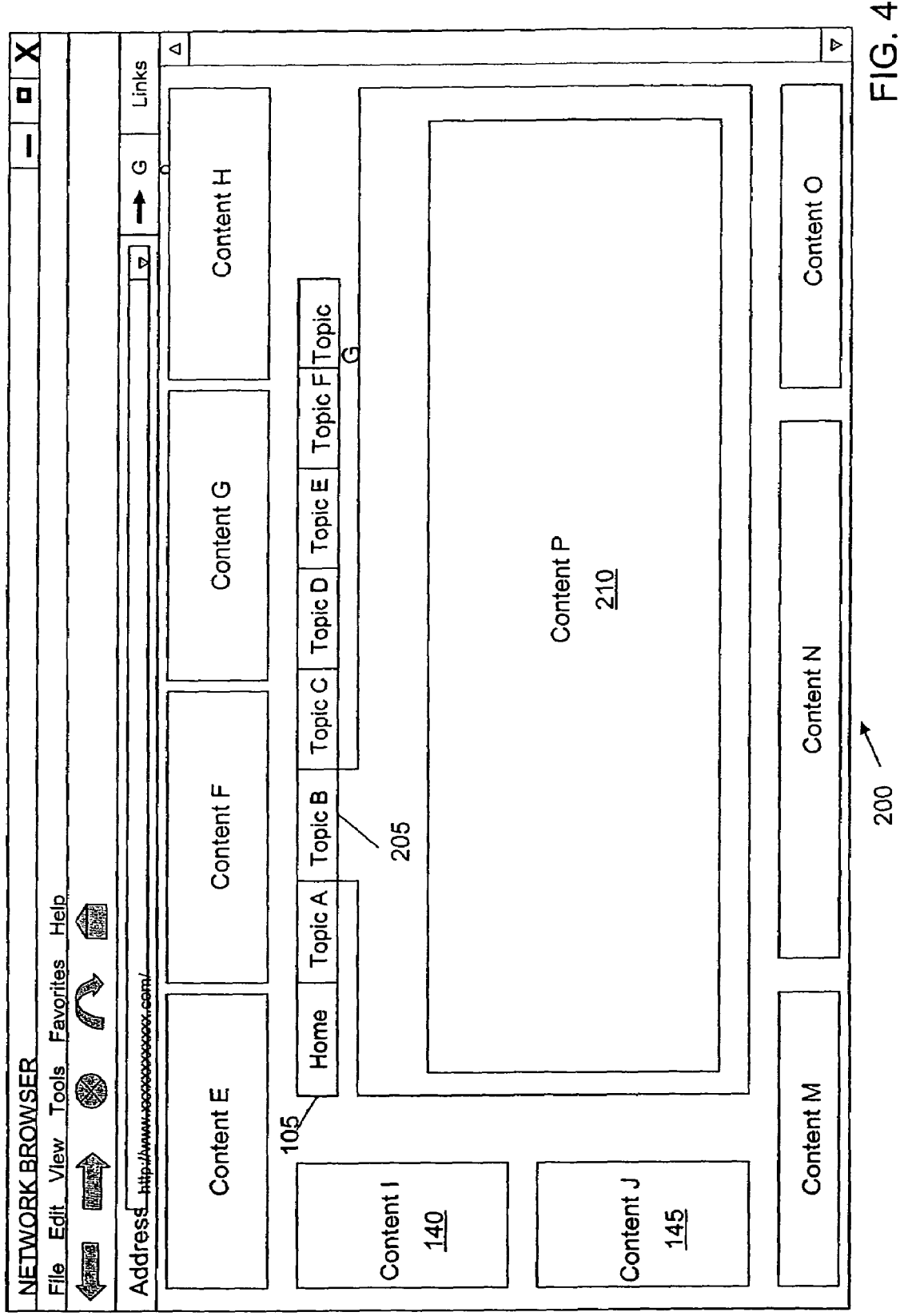
FIG. 4 is an exemplary network browser application window illustrating obstructed content as a result of a user activation of a tab in the network browser application window illustrated with reference to FIG. 3.

FIG. 4 is an exemplary network browser application window 200 illustrating obstructed content as a result of a user activation of a tab in the network browser application window 100 illustrated with reference to FIG. 3. Upon activation of the topic B tab 205, content P 210, which is content relevant to topic B, has replaced content A 110, content B 115, content C 120, and content D 125 as illustrated with reference to FIG. 3. In addition, the content presented in conjunction with the topic B tab 205 takes up a larger portion of the network browser application window 200 than the content presented in conjunction with the home tab 105. As a result, the view of content K 130 and content L 135, as illustrated with reference FIG. 3, has become obstructed by the user activation of the topic B tab 205.

Figure 5:
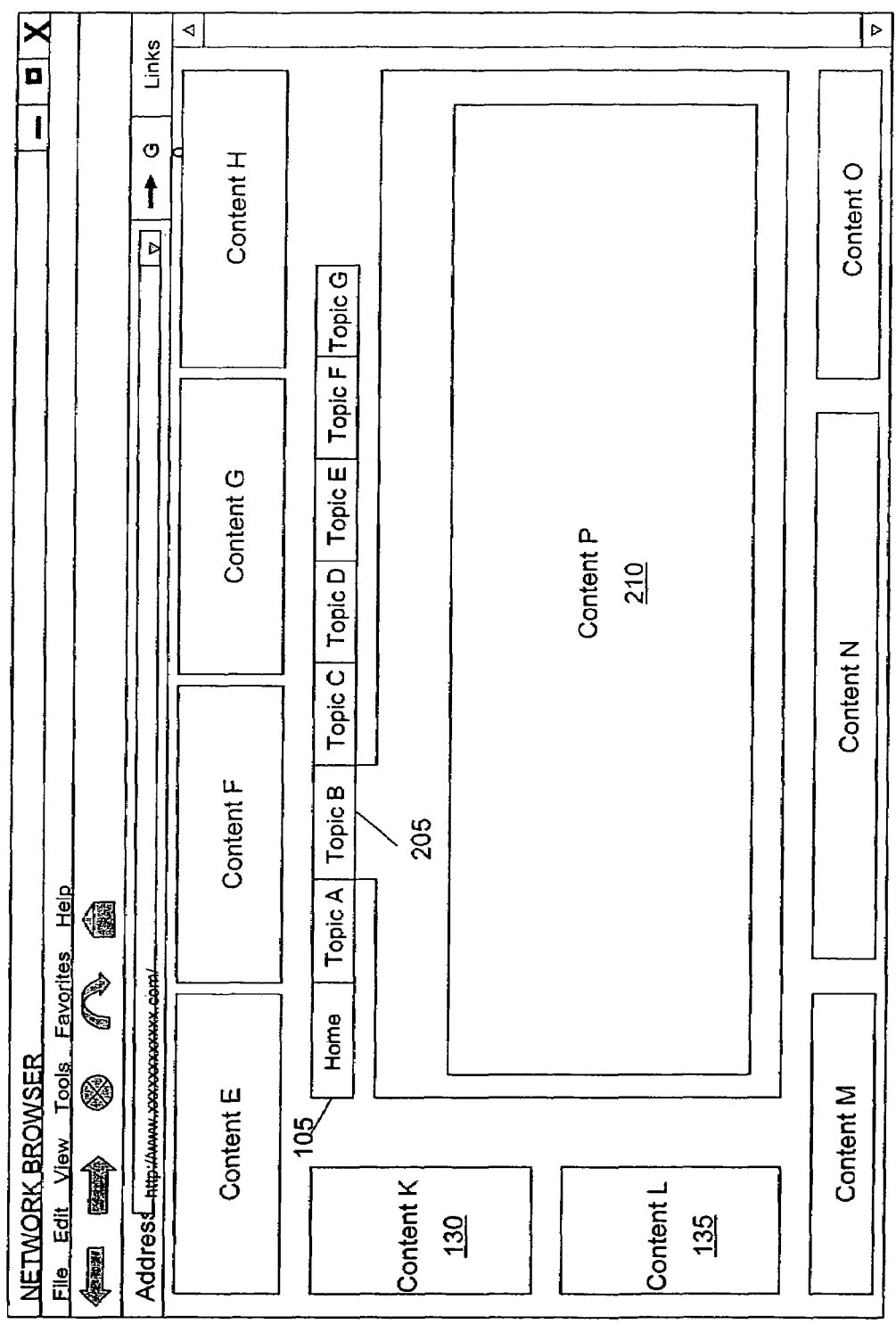
FIG. 5 is an exemplary network browser application window illustrating the obstructed content described with reference to FIG. 4 moved to an unobstructed location.

FIG. 5 is an exemplary network browser application window 250 illustrating the obstructed content described with reference to FIG. 4 moved to an unobstructed location. Based upon a determination described with reference to FIGS. 1 and 2, content K 130 and content L 135 have been moved to unobstructed locations. As a result, content I 140 and content J 145, as illustrated with reference FIGS. 3 and 4, have both been displaced and are no longer visible. This process is generally performed without presentation of application window 200 to the user such that the user has a virtually uninterrupted view of high priority content.

Figure 6:
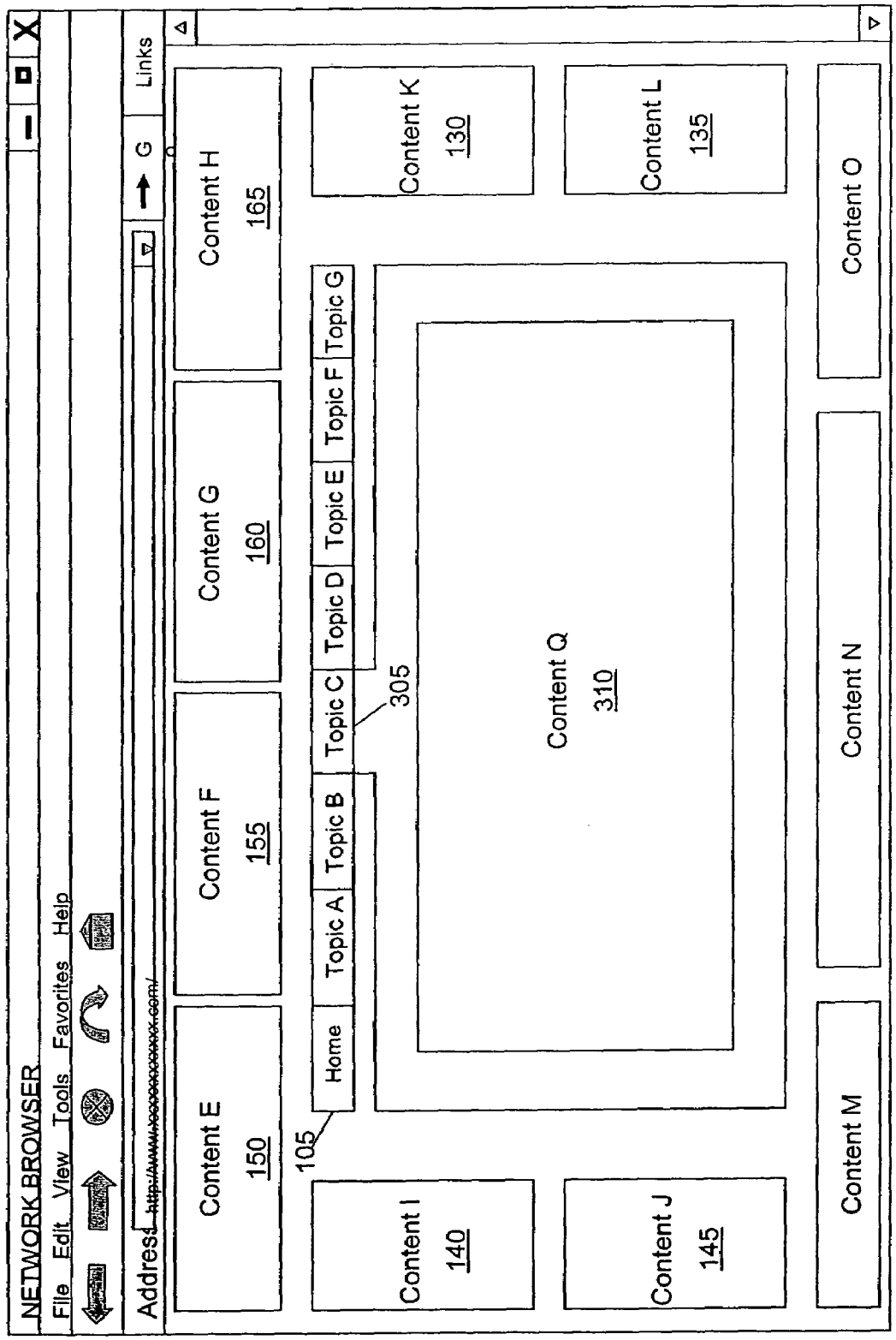
FIG. 6 is an exemplary network browser application window illustrating obstructed content as a result of a user activation of a second tab in the network browser application window illustrated with reference to FIG. 3.

Referring back to FIG. 3, content A 110, content B 115, content C 120, and content D 125 are presented to a user in conjunction with the home tab 105. This home tab content can be presented to users when they first access the website. As a result, the website provider has strong incentive to place high priority content in the home tab 105. FIG. 6 is an exemplary network browser application window 300 illustrating an obstructed view of the home tab content illustrated with reference to FIG. 3 as a result of a user activation of the topic C tab 305. Upon activation of the topic C tab 305, content Q 310, which is content relevant to topic C, has obstructed the view of content A 110, content B 115, content C 120, and content D 125 as illustrated with reference to FIG. 3.

Figure 7:
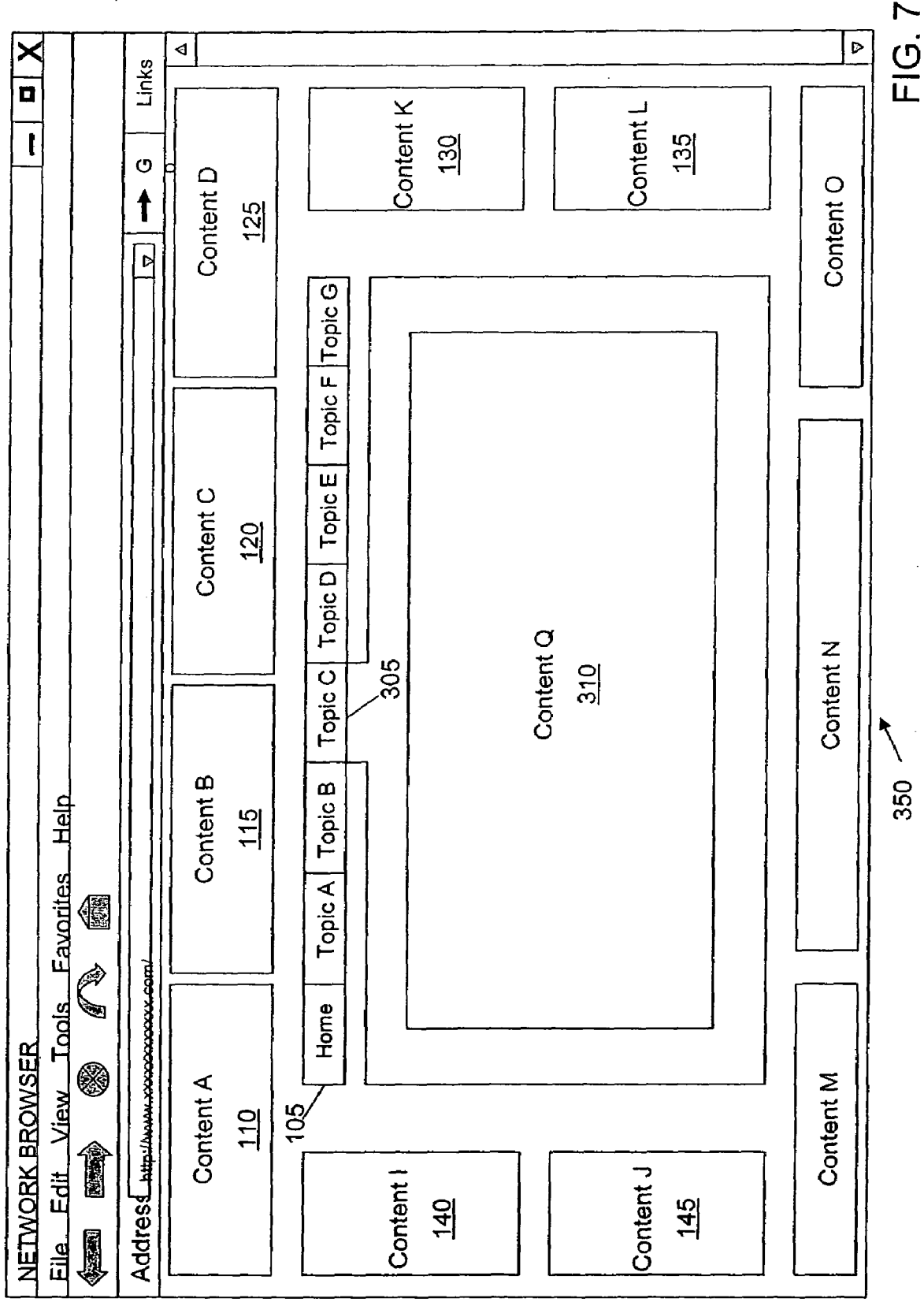
FIG. 7 is an exemplary network browser application window illustrating the obstructed content described with reference to FIG. 6 moved to an unobstructed location.

FIG. 7 is an exemplary network browser application window 350 illustrating movement of the obstructed home tab content described with reference to FIG. 6 to an unobstructed location. Based upon a determination described with reference to FIGS. 1 and 2, content E 150, content F 155, content G 160, and content H 165, as illustrated with reference to FIG. 6, have been displaced by content A 110, content B 115, content C 120, and content D 125, respectively. As a result, the high priority home tab content is able to be viewed by the user. This process is generally performed without presentation of application window 300 to the user such that the user has a virtually uninterrupted view of high priority content.

Figure 8:
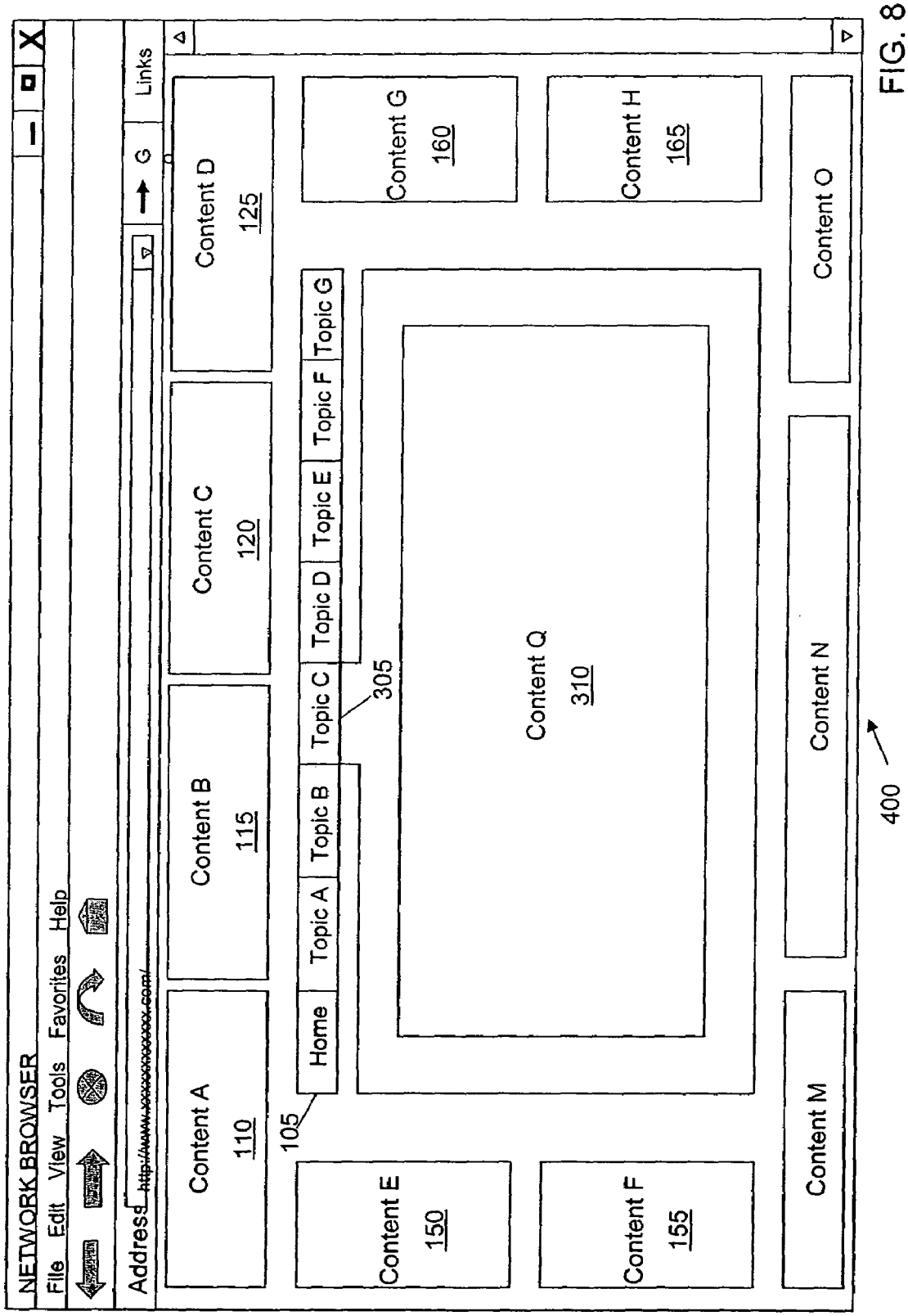
FIG. 8 is an exemplary network browser application window in which the content displaced as a result of moving the obstructed content described with reference to FIG. 7 displaces other existing content.

FIG. 8 is an exemplary network browser application window 400 in which the content displaced as a result of moving the obstructed content described with reference to FIG. 7 displaces other existing content. Specifically, content E 150, content F 155, content G 160, and content H 165, as illustrated with reference to FIG. 6, were displaced when obstructed contents A-D were moved as illustrated with reference to FIG. 7. As illustrated in FIG. 8, based upon a determination described with reference to FIGS. 1 and 2, displaced content E 150, content F 155, content G 160, and content H 165 has displaced existing content I 140, content J 145, content K 130, and content L 135 as illustrated with reference to FIGS. 6 and 7. In one embodiment, displaced content can iteratively continue to displace other existing content until a determination is made that no more displacement should occur.

Figure 9:
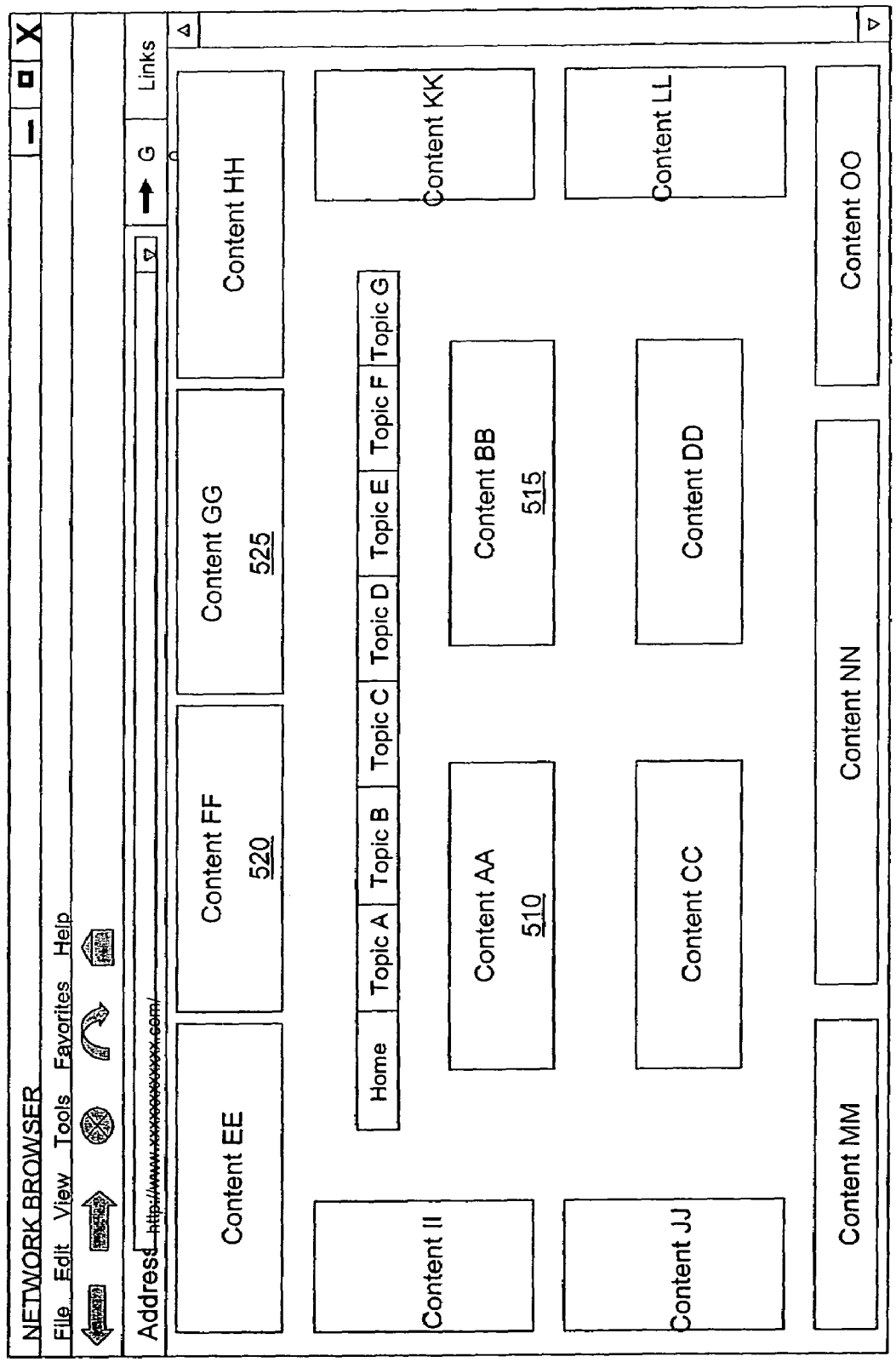
FIG. 9 is an exemplary network browser application window containing drop down menus and in which unobstructed content is presented to a user.
Figure 10:
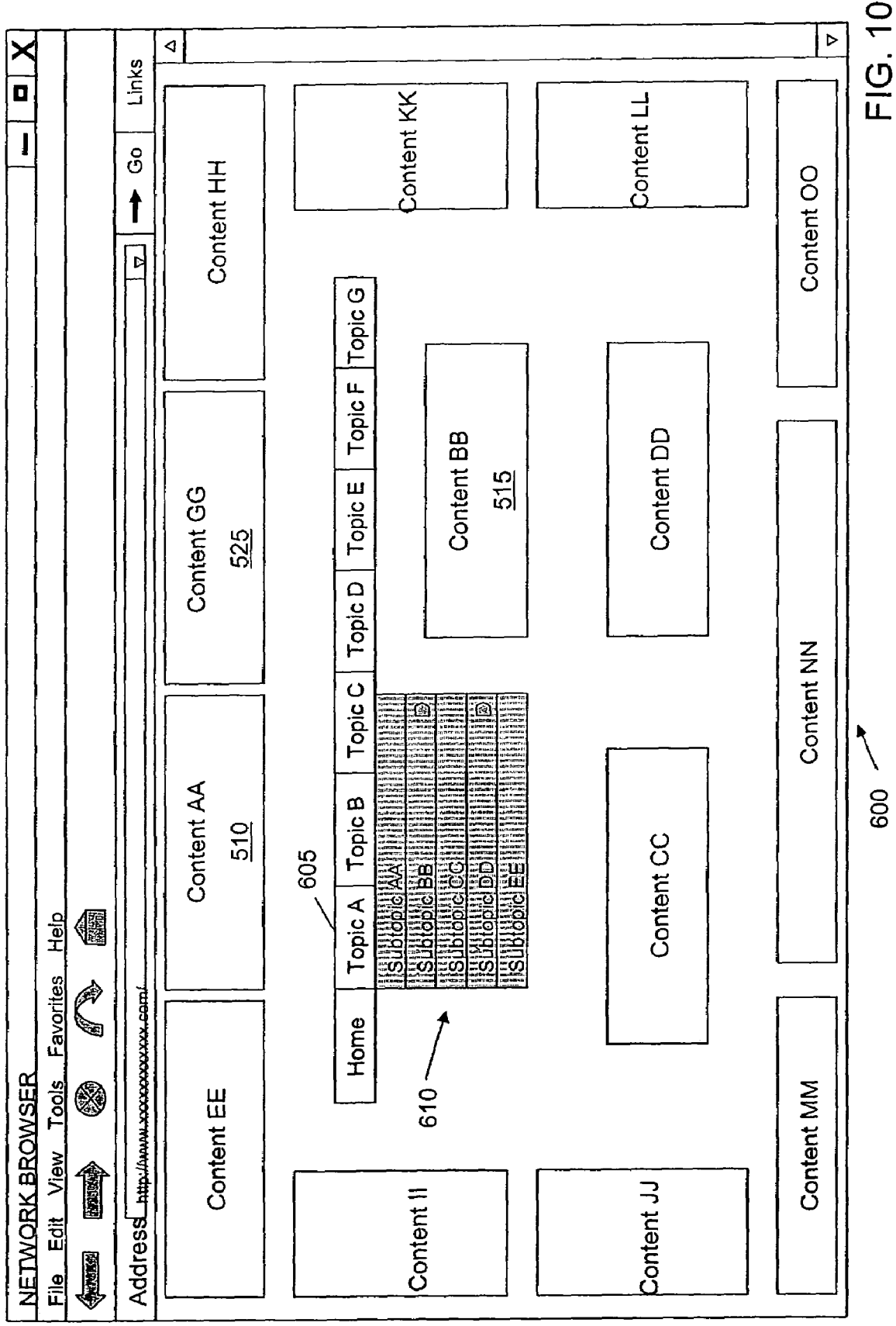
FIG. 10 is an exemplary network browser application window illustrating moved content as a result of a user activation of a drop down menu.
Figure 11:
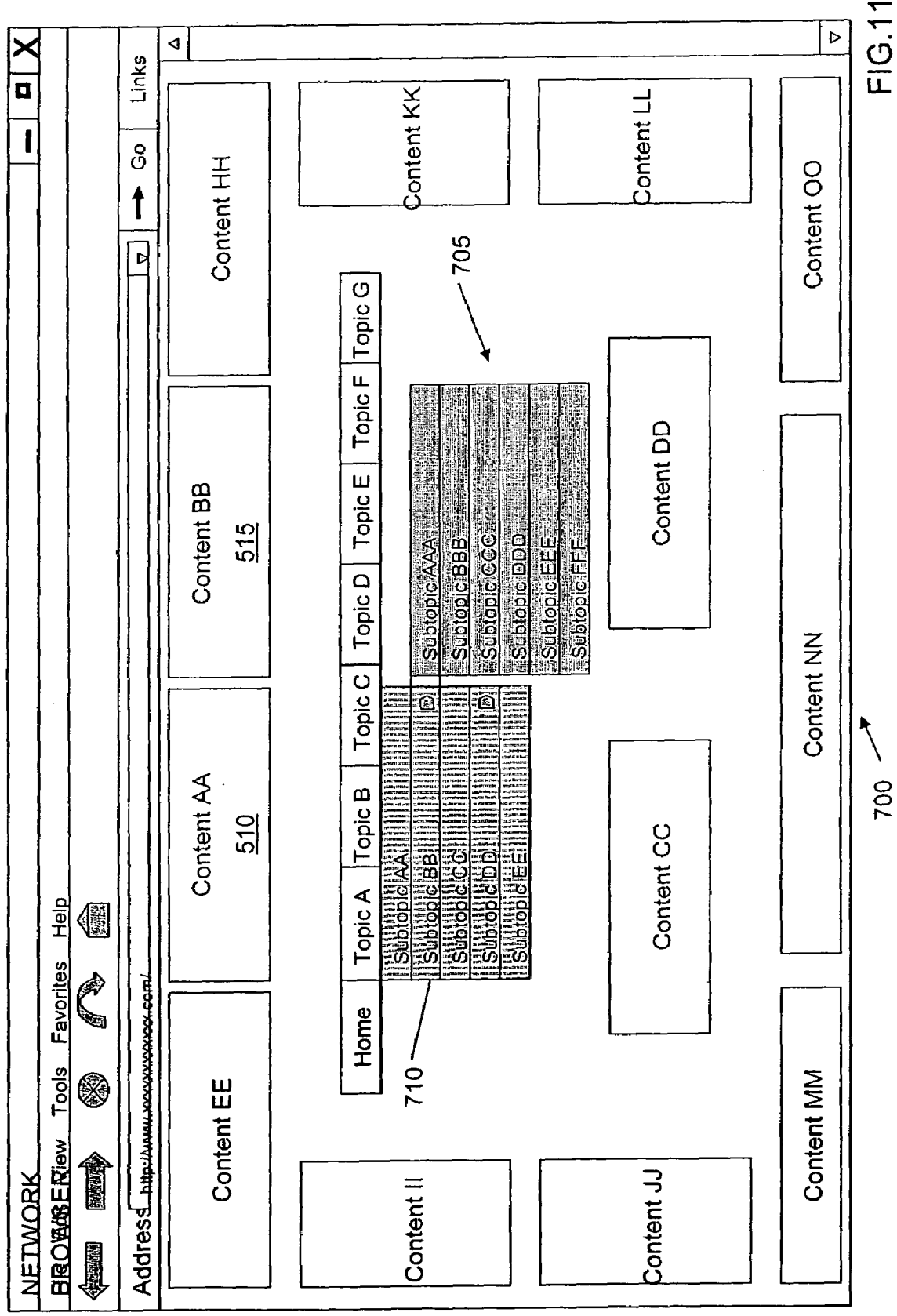
FIG. 11 is an exemplary network browser application window illustrating moved content as a result of a user activation of a second drop down menu.

FIGS. 9-11 further illustrate the moving content process described with reference to FIGS. 1 and 2. FIG. 9 is an exemplary network browser application window 500 containing drop down menus and in which unobstructed content is presented to a user. The presented content includes content AA 510, content BB 515, content FF 520, and content GG 525. FIG. 10 is an exemplary network browser application window 600 illustrating moved content as a result of a user activation of a drop down menu. The activated drop down menu 610 contains sub topics relevant to topic A 605. As a result of the drop down menu 610 activation, the view of content AA 510 as illustrated with reference to FIG. 9 has become obstructed. Based upon a determination described with reference to FIGS. 1 and 2, content FF 520 as illustrated with reference to FIG. 9 has been displaced by content AA 510.

FIG. 11 is an exemplary network browser application window 700 illustrating moved content as a result of a user activation of a second drop down menu 705. The activated second drop down menu 705 contains sub topics relevant to sub topic BB 710. As a result of the drop down menu 705 activation, the view of content BB 515 as illustrated with reference to FIGS. 9 and 10 has become obstructed. Based upon a determination described with reference to FIGS. 1 and 2, content GG 525 as illustrated with reference to FIGS. 9 and 10 has been displaced by content BB 515.

Figure 12:
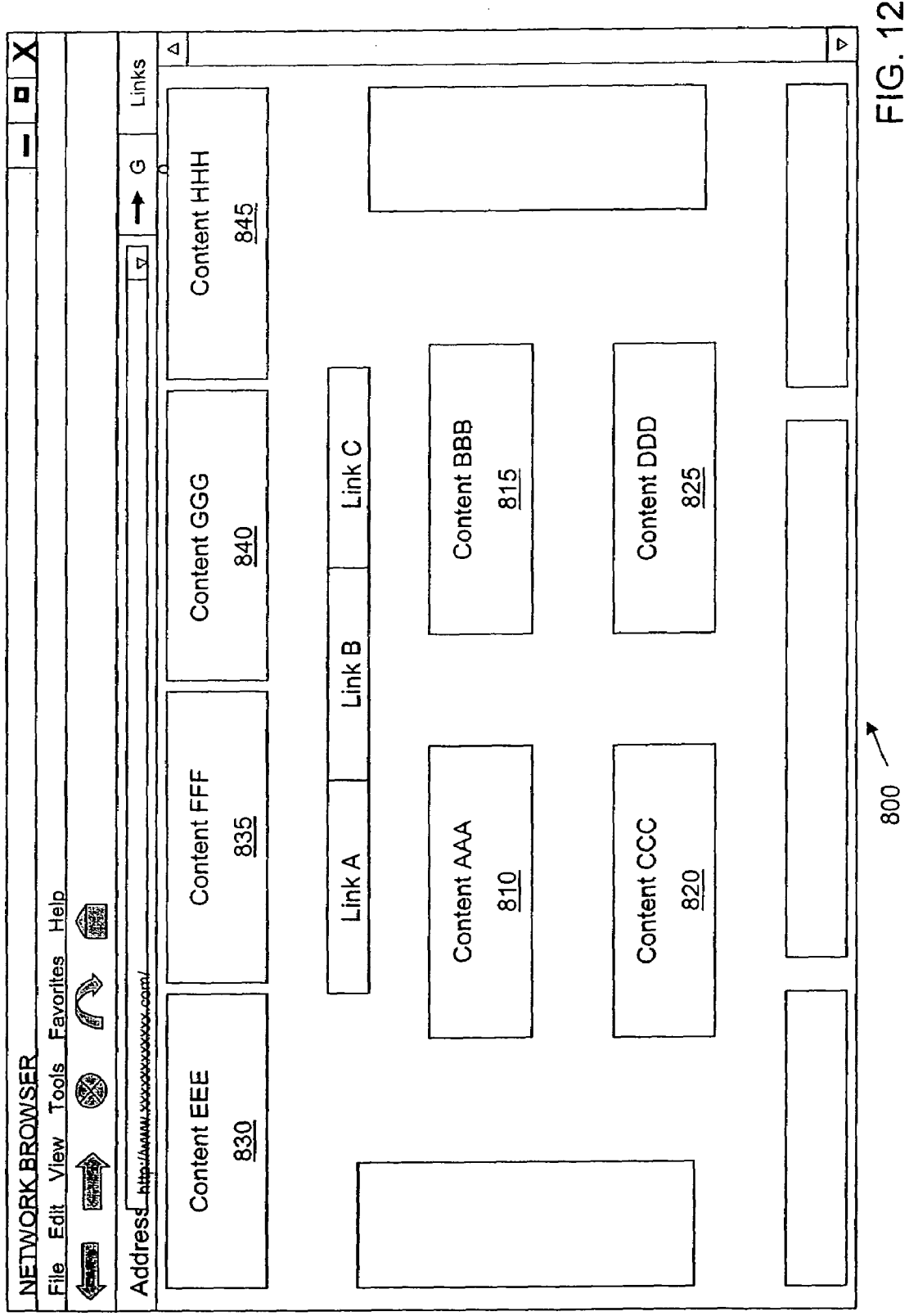
FIG. 12 is an exemplary network browser application window containing links and in which unobstructed content is presented to a user.
Figure 13:
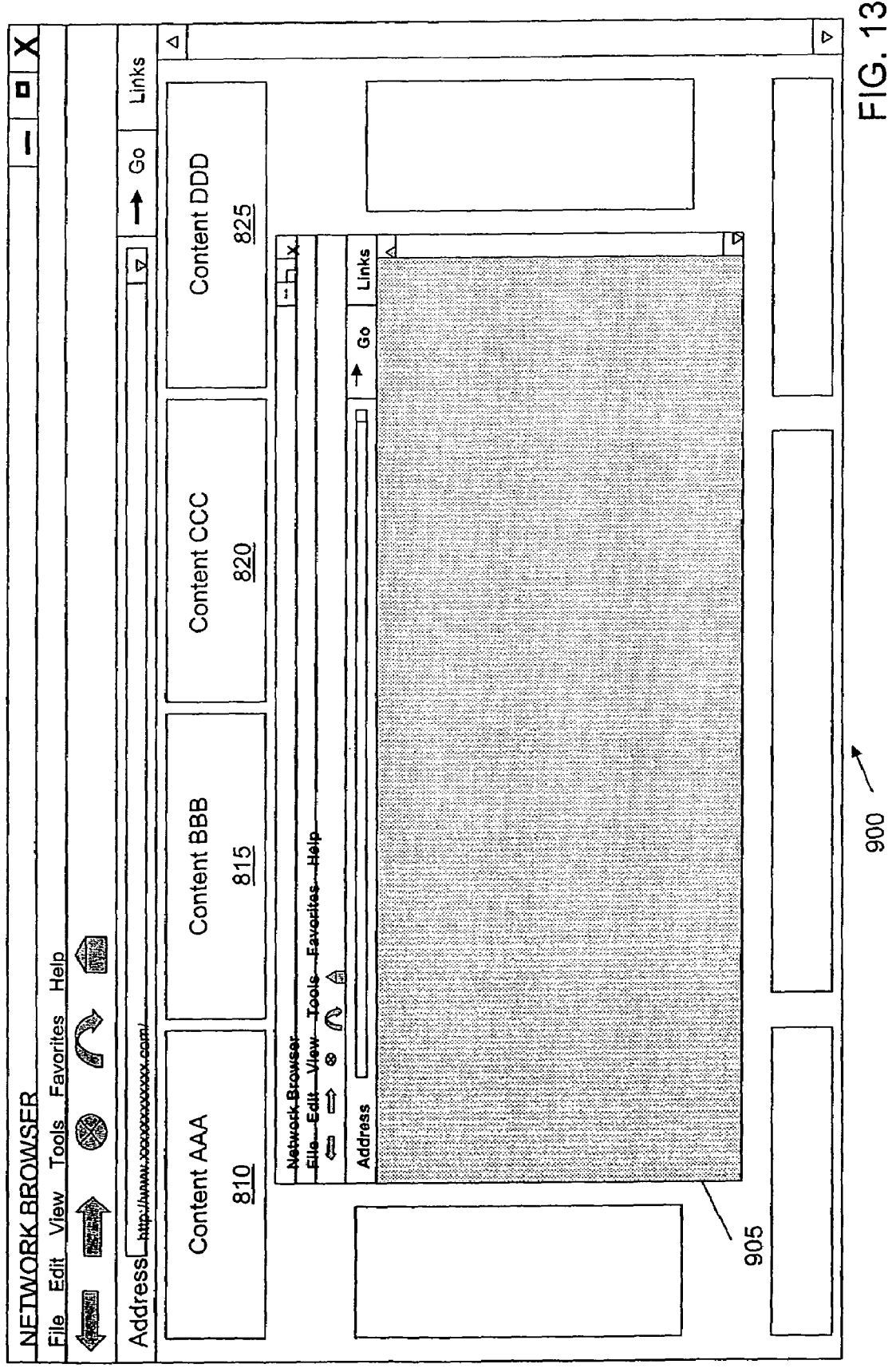
FIG. 13 is an exemplary network browser application window illustrating moved content as a result of a user causing a second network browser application window to open.

FIGS. 12 and 13 further illustrate the moving content process described with reference to FIGS. 1 and 2. FIG. 12 is an exemplary network browser application window 800 containing links and in which unobstructed content is presented to a user. Content AAA 810, content BBB 815, content CCC 820, and content DDD 825 are presented in the center of the network browser application window 800. Content EEE 830, content FFF 835, content GGG 840, and content HHH 845 are presented in the upper region of the network browser application window 800. In addition, there are several links presented.

FIG. 13 is an exemplary network browser application window 900 illustrating moved content as a result of a user causing a second network browser application window 905 to open and obstruct content illustrated with reference to FIG. 12. As a result of a link activation, the view of content AAA 810, content BBB 815, content CCC 820, and content DDD 825 as illustrated with reference to FIG. 12 has become obstructed by the second network browser application window 905. Based upon a determination described with reference to FIGS. 1 and 2, content EEE 830, content FFF 835, content GGG 840, and content HHH 845 as illustrated with reference to FIG. 12 have been displaced by content AAA 810, content BBB 815, content CCC 820, and content DDD 825, respectively.

Figure 14:
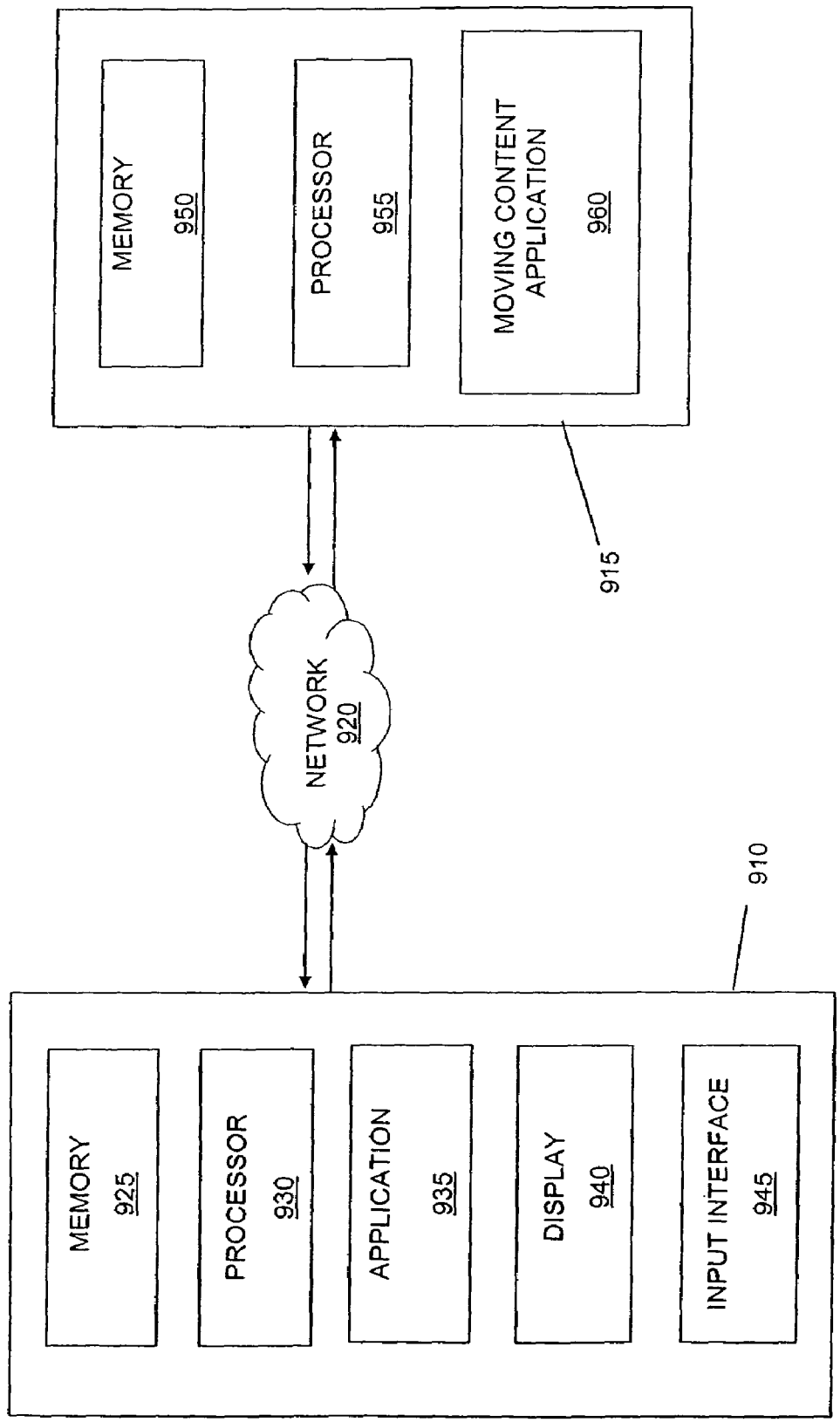
FIG. 14 depicts an exemplary system for implementing the embodiments described with reference to FIGS. 1-13.

FIG. 14 depicts an exemplary system for implementing the embodiments described with reference to FIGS. 1-13. A user device 910 can be connected to a provider device 915 via a network 920. The network 920 can be the Internet or any other network through which devices can share information. The user device 910 can be a desktop computer, laptop computer, cell phone, personal digital assistant, portable gaming unit, or any other device capable of presenting an application window to a user.

The user device 910 includes a memory 925, a processor 930, an application 935, a display 940, and an input interface 945. The application 935 can be stored in the memory 925 of the user device 910 and executed by the processor 930. The display 940 allows a user to view an application window while the application is being executed. The input interface 945 allows a user to communicate with the application 935 through the application window. The input interface 945 can be a mouse, keyboard, remote control, touch screen, device panel, or any other interface by which a user can interact with the application 935. The provider device 915 includes a memory 950, a processor 955, and a moving content application 960. The moving content application 960 can be stored in the memory 950 and executed by the processor 955. The provider device 915 and the user device 910 can communicate with each other via the network 920.

In one embodiment, the application 935 stored on the user device 910 can be a network browser application capable of accessing websites across the network 920. A user can use the network browser application to access a website presented by a provider. The user can view the website through an application window of the network browser application and interact with the website by using the input interface 945. The moving content application 960 performs some or all of the operations described with reference to FIGS. 1 and 2 in response to user actions at the user device 910. In one embodiment, the moving content application 960 is implemented via of computer-readable instructions stored on a computer-readable medium.

The moving content application 960 can detect a user action which will result in an obstructed view of content in the application window. The moving content application 960 can also determine whether the obstructed content should be moved and if so, to which location in the application window. Where appropriate, the moving content application 960 can move the obstructed content to another location. In addition, the moving content application 960 can determine whether any content displaced as a result of moving the obstructed content should be moved, and if so, to which location. Where appropriate, the moving content application 960 can move the displaced content.

In an alternative embodiment, the moving content application 960 can be contained in the user device 910 such that there is no need to communicate with a provider device 915 across a network 920. The moving content application 960 can be incorporated into an application stored in the memory 925 of the user device 910. Alternatively, the moving content application 960 can be a stand alone application stored in the memory 925 of the user device 910.

It is understood that the invention is not confined to the particular embodiments set forth herein as illustrative. The description of the preferred embodiments is for purposes of illustration and not limitation. Those skilled in the art shall be capable of making numerous variations and modifications to the exemplary embodiments without departing from the spirit of the present invention. All such variations and modifications are intended to be within the scope of the present invention as defined in the appended claims. For instance, even though many of the embodiments are described with reference to a network browser application, it is understood that the moving content concept can be applied to any application which presents content to a user. In addition, several exemplary embodiments are shown via flow diagrams. The use of flow diagrams is not meant to be limiting with respect to the sequence of operations performed.

What is claimed is:

1. A method of determining content to present on a display of a device, the method comprising:
controlling a first presentation of a first content at a first location in an application window of an application;
controlling a second presentation of a second content at a second location in the application window of the application;
receiving a user action, wherein the user action comprises at least one of a tab selection or a drop down menu activation;
determining whether at least a portion of the first content will be obstructed due to the user action in the application window; and
if it is determined that the first content will be obstructed, prevent the first content from being obstructed by controlling a third presentation of the first content at the second location to displace the second content based on a comparison between a first content priority value assigned to the first content and a second content priority value assigned to the second content and between a first location priority value assigned to the first location and a second location priority value assigned to the second location.

2. The method of claim 1, wherein the first content priority value has a higher priority than the second content priority value.

3. The method of claim 1, wherein the first content and the second content are presented through a web page.

4. The method of claim 3, wherein the first content comprises an image on the web page.

5. The method of claim 1, wherein the first content comprises any one of a game, a link, news information, sports information, weather information, navigation information, a tab, scrolling text, a menu, an instruction, a logo, contact information, a mission statement, streaming video, music, a picture, retail product information, a disclaimer, a direction, streaming video, an advertisement and a search box.

6. The method of claim 1, wherein the application is a network browser.

7. The method of claim 1, wherein the application is any one of a media player, a word processing application, a document viewing application, a gaming application, an editing application, and an electronic mail application.

8. The method of claim 1, wherein the user action comprises opening a second application window.

9. The method of claim 1, wherein the user action comprises the tab selection.

10. The method of claim 1, wherein the user action comprises the drop down menu activation.

11. The method of claim 1, further comprising controlling a fourth presentation of the second content at a third location to displace a third content at the third location in the application window of the application.

12. The method of claim 1, wherein controlling the third presentation of the first content in the second location comprises opening a second version of the first content in the second location in the application window of the application.

13. A computer-readable storage medium having computer-readable instructions stored thereon, which when executed by a processor, cause a computing device to:
receive a first content priority value of a first content;
receiving a second content priority value of a second content, wherein the first content is of a higher priority than the second content;
control a first presentation of the first content at a first location in an application window of an application;
control a second presentation of the second content at a second location in the application window of the application;
receive a user action from the application, wherein the user action comprises at least one of a tab selection or a drop down menu activation;
receive a first location priority value of the first location;
receiving a second location priority value of the second location;
determine whether at least a portion of the first content will be obstructed due to the user action; and
if it is determined that the first content will be obstructed, prevent the first content from being obstructed by controlling a third presentation of the first content to displace the second content based on a comparison between the first content priority value and the second content priority value and between the first location priority value and the second location priority value.

14. A device for presenting content to a user, the device comprising:
an application, the application comprising computer code configured to cause the device to
receive a first content priority value of a first content;
receiving a second content priority value of a second content, wherein the first content is of a higher priority than the second content;
receive a first location priority value of a first location;
receiving a second location priority value of a second location;
control a first presentation of the first content at the first location in an application window of a second application;
control a second presentation of the second content at the second location in the application window of the second application;
receive a user action from the second application, wherein the user action comprises at least one of a tab selection or a drop down menu activation;
determine whether at least a portion of the first content will be obstructed due to the user action; and
if it is determined that the first content will be obstructed, prevent the first content from being obstructed by controlling a third presentation of the first content to displace the second content based on a comparison between the first content priority value and the second content priority value and between the first location priority value and the second location priority value;
a memory, wherein the memory is configured to store the application; and
a processor, wherein the processor is coupled to the memory and configured to execute the application.

15. A system for presenting content to a user, the system comprising
a first device, the first device comprising
a first application, the first application comprising computer code configured to cause the first device to
receive a first content priority value of a first content;
receiving a second content priority value of a second content, wherein the first content is of a higher priority than the second content;
receive a first location priority value of a first location;
receiving a second location priority value of a second location;
control a first presentation of the first content at the first location in an application window of a second application;
control a second presentation of the second content at the second location in the application window of the second application;
receive a user action from the second application, wherein the user action comprises at least one of a tab selection or a drop down menu activation;
determine whether at least a portion of the first content will be obstructed due to the user action; and
if it is determined that the first content will be obstructed, prevent the first content from being obstructed by controlling a third presentation of the first content to displace the second content based on a comparison between the first content priority value and the second content priority value and between the first location priority value and the second location priority value;
a first memory, the first memory configured to store the first application; and
a first processor, the first processor coupled to the first memory and configured to execute the first application; and
a second device in communication with the first device via a network, the second device comprising
the second application, the second application comprising computer code configured to cause the second device to present the application window to a user,
wherein the first content and the second content are presented in the application window;
a second memory, the second memory configured to store the second application; and
a second processor, the second processor coupled to the second memory and configured to execute the second application.

16. The computer-readable storage medium of claim 13, wherein the user action comprises the tab selection.

17. The computer-readable storage medium of claim 13, wherein the user action comprises the drop down menu activation.

18. The device of claim 14, wherein the user action comprises the tab selection.

19. The device of claim 14, wherein the user action comprises the drop down menu activation.

20. The device of claim 14, wherein the computer code is further configured to cause the device to control a fourth presentation of the second content at a third location to displace a third content at the third location in the application window of the second application.

* * * * *